(12) United States Patent
Rennebeck

(10) Patent No.: US 6,428,678 B1
(45) Date of Patent: Aug. 6, 2002

(54) METHOD AND DEVICE FOR OBTAINING SYNTHESIS GAS

(76) Inventor: Klaus Rennebeck, Blumenstrae 16, D-73240 Wendlingen (DE)

(*) Notice: Subject to any disclaimer, the term of this patent is extended or adjusted under 35 U.S.C. 154(b) by 0 days.

(21) Appl. No.: 09/622,557
(22) PCT Filed: Mar. 1, 1999
(86) PCT No.: PCT/EP99/01325
§ 371 (c)(1), (2), (4) Date: Dec. 1, 2000
(87) PCT Pub. No.: WO99/45172
PCT Pub. Date: Sep. 10, 1999

(30) Foreign Application Priority Data

Mar. 1, 1998 (DE) .................................. 198 08 411

(51) Int. Cl.⁷ .............................. C25B 1/00; C25B 1/02; C25C 1/00
(52) U.S. Cl. ..................... 205/555; 205/615; 205/637
(58) Field of Search ............................... 205/615, 637, 205/555

(56) References Cited

U.S. PATENT DOCUMENTS 3,228,797 A  1/1966  Brown et al. ................ 136/86
4,793,904 A * 12/1988 Mazanec et al. ............ 204/59 R
6,139,810 A * 10/2000 Gottzmann et al. ......... 422/197

FOREIGN PATENT DOCUMENTS

DE         42 35 125 A1    4/1994
WO         WO 97/26225     7/1997

* cited by examiner

Primary Examiner—Edna Wong
(74) Attorney, Agent, or Firm—Fay, Sharpe, Fagan, Minnich & McKee, LLP

(57) ABSTRACT

The present invention is directed to a process and apparatus for producing synthesis gas by electrolysis. The process for producing synthetic gas is heat exchanged between reactants and reaction products of at least one reaction product carried out using textile micro-hollow fibers having non-activated surfaces as heat exchangers as solid electrolytes, the inside and outside surfaces which carry the anodes and cathodes, respectively. The apparatus for producing synthesis gas by electrolysis comprises a multitude of stacked textiles micro-hollow fibers as solid electrolytes, the inside and outside surfaces of which carry the anodes and cathodes, respectively, wherein the ends of the micro-hollow fibers are bound into a frame, and a pressure housing accommodating the stacks is made from a ferromagnetic material and has a partly enameled surface.

26 Claims, 2 Drawing Sheets

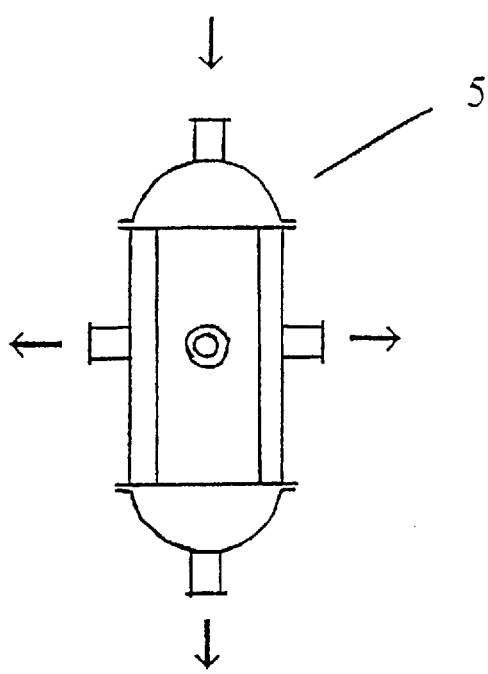
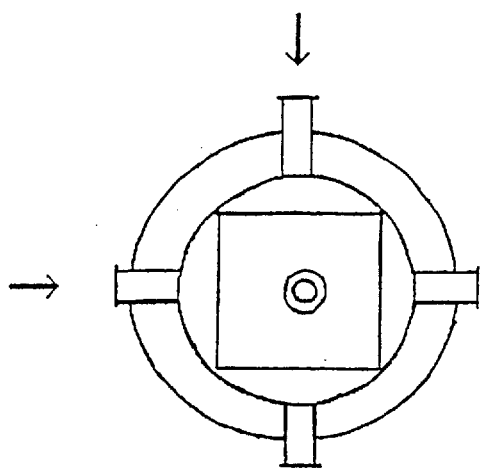
Fig. 2a
Fig. 2b
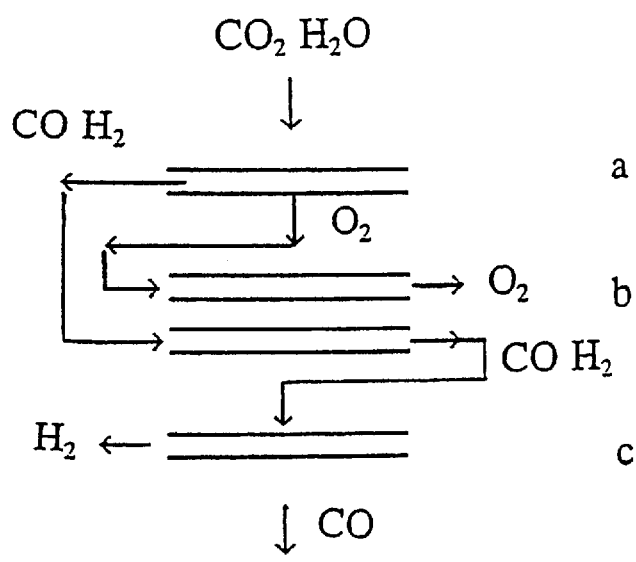
Fig. 2c

METHOD AND DEVICE FOR OBTAINING SYNTHESIS GAS

The present invention relates to a process and an apparatus for producing synthesis gas.

Following the progress made in the development of fuel cells for generating electrical energy, there exists an increased demand for hydrogen-containing fuels for the fuel cell reaction. These fuels may be either hydrogen gas or also a hydrogen-containing compound, e.g. methyl alcohol, which is fed to the fuel cell directly or after passing through a gas reforming process. Especially when using fuel cells for electrically operated motor vehicles it is advantageous when the fuel can be made available directly inside the vehicle. A possible process for producing hydrogen as fuel or as starting product for producing a hydrogen-containing fuel is, for example, the known production of synthesis gas from the substances $CO_2$ and $H_2O$. At present the synthesis gas production takes place by high-pressure electrolysis processes at approx. 1000° C. on large plants.

The principle of such a synthesis gas production is described, for example, in the article "Production of liquid fuels from atmospheric carbon dioxide" by M. Specht and A. Bandi, published in "Themen 94/95" of the Forschungsverbund Sonnenenergie (Solar Enemy Research Institute). According to this publication a tube reactor is used for the synthesis gas production. However, for use in motor vehicles a process is required which permits, in the smallest possible space, a highly efficient yield of synthesis gas.

It is, therefore, the object of the present invention to indicate a process and an apparatus which permits the production of synthesis gas in the smallest possible space, e.g. on board a motor vehicle.

According to the invention this object is addressed by a process for producing synthesis gas by electrolysis, characterised in that the electrolysis is carried out using textile micro-hollow fibers as solid electrolytes, the inside and outside surfaces of which carry the anodes and cathodes respectively, as well as by an apparatus for producing synthesis gas by electrolysis, characterised in that it comprises a multitude of stacked textile micro-hollow fibers as solid electrolytes, the inside and outside surfaces of which carry the anodes and cathodes respectively, wherein the ends of the micro-hollow fibers are bound in a form-stable manner into a frame.

The use of textile micro-hollow fibers as solid electrolytes has the advantage that for the electrolysis reaction only little space is required at a simultaneously large electrode surface. Understood under textile fibers are in general those fibers that can be processed in the manner of textiles. Such fibers have a great length compared to their cross-section as well as sufficient strength and flexibility. Because of the small diameter and the corresponding small wall thicknesses of these fibers, the diffusion through the hollow fibers takes place in an extremely short time compared to the tube reactors of the state of the art. For the use of micro-hollow fibers in the process according to the invention, they must be extremely homogeneous with regard to their dimensions, so as to ensure a uniform reaction pattern. For this reason the fluctuations of wall thickness and outside diameter of the micro-hollow fibers should not be more than each approx. +/−10%, in particular not more than each approx. +/−8%. Particularly preferred are those micro-hollow fibers with which these fluctuations each lie under +/−6%.

The manufacture of such micro-hollow fibers is described, for example, in the EP-A-0 874 788 of the same applicant. The micro-hollow fibers can be made with very small wall thicknesses of approx. 0,01 to 15 μm and outside diameters from down to 0,5 to 35 μm. Because of the small dimensions such micro-hollow fibers display textile properties, i.e. they can be bent particularly easily without breaking. By the manufacturing process described in the EP-A-0 874 788 the micro-hollow fibers can be manufactured with extremely accurate dimensions, wherein the fluctuation range of wall thickness and outside diameter is not more than approx. +/−6%. The precision of maintaining the values of the diameter and in particular of the wall thickness ensures a homogeneous reaction pattern over the entire length of the hollow fibers.

Alternatively, it is possible to manufacture the required hollow fibers from flat, smooth or structured, plastic bipolar electrolytic foils, which are rolled into straws or wound into helical or spiral tubes. In this way, in particular hollow fibers with an outside diameter of approx. 0,28 to 10 mm can be produced. When rolling the foils into straws, one proceeds in this connection in the same way as with the process which is known, for example, for making cigarettes. The lengths of the straws or spiral tubes produced in this manner generally lies preferably between approx. 0,03 m and 3,00 m, in which connection for the use of the straws in the process according to the invention for the synthesis gas production a length of approx. 0,03 m to approx. 0,20 m is preferred. It is possible to realise any desired and technically expedient length/diameter ratio. After the forming of the straws or spiral tubes, they are ceramically baked. The electrolytic foils can be extruded together with the electrode material before they are processed further into straws or spiral tubes. To manufacture the electrolytic foils, in this connection in particular the sol-gel process can be used.

By using structured, e.g. pleated, or curved or corrugated electrolytic foils for making the straws or spiral tubes, the surface of the straws or tubes that is available for the reaction can be increased further. Another advantage of the use of structured foils lies in the increased bending strength of the straws and tubes produced therefrom.

As starting materials for the micro-hollow fibers used in the process according to the invention, among others hydrolysable substances, collagens, proteins, urea, gelatine, starches or ceramic materials or the precursors of a ceramic material can be used.

The thermal energy required for the synthesis gas production can be made available, for example, by wetting a zeolite. Also suitable for storing heat are melts of aluminium and tin. Also the use of a catalytic atmospheric burner is conceivable.

To improve the reactivity and to achieve a lower operating temperature, the textile micro-hollow fibers are coated on both sides with a catalyst, preferably an element of the eighth sub-group, wherein platinum is regarded as particularly suitable. With this catalyst an effective synthesis gas reaction can take place already at approx. 85° C. to 180° C. or 500° C. to 730° C. in the case of the high-temperature electrolysis and at a pressure of approx. 0,1 to 3 bar. The pressure vessel must in this case be designed for a pressure up to 12 bar. When using a platinum catalyst, the number of atoms per cluster is preferably increased to 8 to 15. In this way an additional saving of material can be obtained. Furthermore, because of the increased number of atoms in the clusters, the starting time of the catalyst can be shortened and the reactivity of the reactants increased. The catalyst must be porous so that it will not prevent the flow of gas through the micro-hollow fiber membrane. Also suitable as catalysts are the following materials: spinnel (MgAlO), titanium dioxide (in its anatase form), vanadium pentoxide, tungsten trioxide, copper oxide, molybdenum oxide and iron oxide. Heavy as well as light platinum is suitable as catalyst material.

Preferably, the textile micro-hollow fibers are made from an oxide of the titanium group which is stabilised with a rare earth metal. Particularly preferred for the process according to the invention are textile micro-hollow fibers which are made from yttrium-stabilised zirconium oxide. This material is known as electrolyte material and has proved eminently suitable under the temperature conditions required for the electrolysis.

For use in the process according to the invention for the synthesis gas production, micro-hollow fibers with an outside diameter of approx. 1 $\mu$m to 10 mm, especially between 50 $\mu$m and 280 $\mu$m, are particularly preferred. Hollow fibers with these dimensions can easily be arranged in stacks and are easier to handle. In addition they offer an excellent surface/volume ratio.

The process according to the invention is preferably carried out in such a way that carbon dioxide and water or water vapour are each fed into one end of the hollow fiber lumen and are subjected to a high-temperature electrolysis, wherein the oxygen passing out through the wall of the hollow fibers as permeate is drawn off separately from the carbon monoxide and hydrogen synthesis gas flowing out of the second end of the hollow fiber lumen. The occurring oxygen can then, for example, be fed to a fuel cell. In this way a utilisation of the hydrogen gas contained in the synthesis gas as well as of the "by-product" oxygen is possible.

To separate the hydrogen contained in the synthesis gas from the carbon monoxide after the flowing out of the lumen of the hollow fiber electrolyte, the hydrogen can be passed through a gas separating membrane. The pororosity of the membrane must then be chosen in such a way that the gaseous hydrogen can diffuse through it, whereas the carbon monoxide remains on the inlet side. An as clean as possible separating of the two gas constituents is particularly desirable from the point of view of a high efficiency of the subsequent process steps, during which one or both constituents of the synthesis gas are used.

The gas separating membrane may also be in the form of micro-hollow fibers. In this case the synthesis gas flowing out of the electrolyte micro-hollow fibers is fed into the lumen of the gas-separating hollow fibers. The dimensions of the micro-hollow fibers used for the gas separation can be substantially the same as those for the synthesis gas production, wherein on the hollow fibers for the gas separation no electrodes are required.

The process according to the invention can be used within the framework of a system for generating electrical energy by fuel cells, in particular on board a motor vehicle. With this the synthesis gas reaction supplies the hydrogen gas required for the operation of the fuel cell, which can be fed directly to the fuel cell, or can be processed further into hydrocarbon-containing compounds, in particular methyl alcohol. The intermediate step of the methyl alcohol production has the advantage that the produced methyl alcohol, because it is liquid under normal conditions, can easily be stored or put into a buffer store, e.g. on board a motor vehicle. In this way the production of the fuel and the use thereof can be better separated with regard to time.

The hydrogen contained in the synthesis gas can, therefore, after its separation be fed to a fuel cell as fuel. In the fuel cell an oxidation reaction then takes place with the release of energy which can be used, for example, to drive an electric vehicle.

In terms of a multiple utilisation of the reaction products in question, preferably at least one reaction product of the fuel cell reaction is fed back into the synthesis gas reaction. For example, the carbon dioxide formed during the fuel cell reaction can also be used for the methyl alcohol synthesis according to $CO_2+3H_2 \rightarrow CH_3OH+H_2O$.

The carbon monoxide contained in the synthesis gas can be separated and with hydrogen or a hydrogen-supplier can be synthesised into a hydrocarbon-containing compound, in particular methyl alcohol. The relevant reaction $CO+2H_2 \rightarrow CH_3OH$ is preferred for the synthesis of methyl alcohol over the methyl alcohol production according to the equation $CO_2+3H_2 \rightarrow CH_3OH+H_2O$, as the former reaction on the one hand takes place without producing product water and on the other hand, during the second reaction the catalysts quickly display ageing symptoms, which require frequent material renewals.

The hydrogen required for the methyl alcohol synthesis is preferably obtained from salt solutions of elements of the eighth sub-group, in particular palladium rhodium, ruthenium, osmium, iridium or platinum, wherein as catalysts metal hydrides, in particular magnesium hydride, and/or metal carbides are used and the required reaction energy is obtained by means of an electrolyser, e.g. a wind-driven electrolyser. The reaction itself, which occurs for example according to the equation $Pd+H_2O \rightarrow Pd*2H_2+CO_2$, can take place in micro-hollow fibers that have the same dimensions as those used in the synthesis gas production. Also in this case the hollow fiber walls are made as electrodes, the inside wall acting as anode. The hydrogen is then released inside the micro-hollow fibers and can, for example, be separated by means of a molecular sieve, whereas the carbon dioxide flows out through the micro-hollow fiber wall. This hydrogen source can be used, besides for the synthesis gas production according to the invention, for the methyl alcohol production.

Hydrogen can furthermore be obtained from reactions according to the equation $C+2H_2O \rightarrow CO_2+2H_2$ or $CO+H_2O \rightarrow CO_2+H_2$. In addition to carbon monoxide and its compounds, it is also possible to obtain the required hydrogen on the basis of silicon or its compounds. Here especially the reactions $Si+3H_2O \rightarrow H_2SiO_3+2H_2$ or $SiH_4+2H_2O \rightarrow SiO_2+4H_2$ can be mentioned. For the subsequent reduction of the $SiO_2$, among others magnesium or aluminium can be used. These are endothermic reactions that take place according to the equations $2Mg+SiO_2 \rightarrow Si+2MgO$ or $4Al+3SiO_2 \rightarrow 3Si+2Al_2O_3$. The reaction product $Al_2O_3$ can be removed from the reaction cycle by cyclone separators and be used again, e.g. as raw material for the manufacture of micro-hollow fibers.

Finally, also carbides, especially magnesium and calcium carbide, can be used as hydrogen carriers within the framework of the reactions $Mg_2C_3+4H_2O \rightarrow 2Mg(OH)_2+C_3H_4$ or $CaC_2+2H_2O \rightarrow Ca(OH)_2+C_2H_2$. In addition, carbides in a fuel cycle are also suitable as heating media for making available the thermal energy required for the endothermic reactions.

The carbon dioxide required for the synthesis gas reaction can be obtained, for example, from reactions of carbon-containing compounds with water or water vapour, from gases that contain carbon dioxide or from solid storage media, in particular from barium carbonate. It is possible, in particular, to use carbon dioxide from the air. As solid storage medium barium oxide is suitable, for example, in which case the carbon dioxide is stored according to the equation $BaO+CO_2 \rightarrow BaCO_3$. Also a deposition of the carbon dioxide in a molecular sieve is conceivable. In addition to the synthesis gas production, the carbon dioxide can also be converted according to the equation $CO_2+H_2 \rightarrow CO+H_2O$ or can be used for producing methane according to $CO_2+4H_2 \rightarrow CH_4+2H_2O$, which in turn constitutes a storage medium for hydrogen for the fuel cell operation.

Preferably, the heat exchange between the reactants and the reaction products of at least one of the aforementioned reactions is carried out by using micro-hollow fibers with non-activated surfaces as heat exchangers, which are operated in particular in the cross-current mode. This is advantageous, for example, with the synthesis gas production according to the invention itself. In this case the carbon dioxide and the water or water vapour, before being fed into the electrolyte micro-hollow fibers, are fed jointly into the inside of micro-hollow fibers with non-activated surfaces, where they are heated by the reaction products of the synthesis gas production flowing perpendicular to the longitudinal axis of the heat exchanger fibers. In this way the energy consumption required for the high-temperature electrolysis can be reduced considerably.

The produced methyl alcohol can either be used directly as fuel in a so-called DM fuel cell (=Direct Methanol fuel cell), or it can be subjected to a so-called gas reforming process according to the reaction equation $CH_3OH+H_2 \rightarrow CO+3H_2$, in which case the released hydrogen can be used, for example, for the operation of a conventional fuel cell (Proton Exchange Membrane Fuel Cell). The advantage of using the hydrogen obtained from the reforming process over the direct use of methyl alcohol in a DM fuel cell lies in the considerably greater power yield of the first mentioned method. Thus, when using hydrogen as fuel, an efficiency of 60% can be obtained compared to an efficiency of only approx. 20% for the direct use of methyl alcohol.

The process of the gas reforming can also be carried out using micro-hollow fibers as reaction vessels, wherein the micro-hollow fibers used for this process preferably are made from the same starting material as the micro-hollow fibers used for the synthesis gas production and are also coated with catalysts, preferably from elements of the eighth sub-group. The thermal energy required for the reforming process can again be made available by an electrolyser or by means of microwaves. Also here the use of micro-hollow fiber heat exchangers can produce a high energy saving.

The apparatus suitable for producing synthesis gas by electrolysis comprises a multitude of stacked textile micro-hollow fibers as solid electrolytes, the inside and outside surfaces of which carry the anodes and cathodes respectively, wherein the ends of the micro-hollow fibers are bound in a form-stable manner into a frame. The stacked micro-hollow fibers accordingly form a disc of finite thickness, which is delimited by the frame. The binding of the micro-hollow fibers into the frame can take place in any suitable manner, e.g. by casting the hollow fiber ends into the frame. At the outer periphery of the frame the ends of the hollow fibers are exposed so that access to the hollow fiber lumen is ensured.

Preferably, the micro-hollow fibers inside the stack are arranged parallel to one another, in which case the frame has a rectangular or square shape. The micro-hollow fibers of a stack accordingly all have substantially the same length. With this embodiment the feeding of the materials into the hollow fiber lumen takes place on two opposite sides.

The apparatus according to the invention may have at least one further stack of textile micro-hollow fibers which act as heat exchangers between the reactants and the reaction products of the synthesis gas production. The advantage of using heat exchangers for the synthesis gas production has already been described in the foregoing.

According to a particularly preferred embodiment the apparatus according to the invention has at least one further stack of textile micro-hollow fibers which act as gas separating membrane for the reaction products of the synthesis gas production.

The individual stacks preferably have the same size and shape, so that as function modules they can in turn be stacked on top of one another and/or be arranged offset by 90° relative to one another. In this way multi-function modules can be produced, the dimensions of which are so small that they can easily be accommodated on board an electric motor vehicle to supply fuel for a fuel cell which serves to produce the drive energy for the vehicle. The energy required for the endothermy of the described reactions can be made available by a so-called electrolyser, e.g. a wind-driven electrolyser.

The individual stacks or function modules may be accommodated according to the invention in a pressure housing which is made from a ferromagnetic material and the surface of which is partly enamelled. The use of partly enamelled pressure vessels for the processes of the high-temperature electrolysis is known in the state of the art. The enamel layer serves in this case to avoid contact between highly heated reactants and the ferromagnetic material.

The non-enamelled part of the surface of the pressure housing may be provided with a first coating of aluminium nitride. Aluminium nitride, which has excellent heat conduction properties, serves as scale protection for the non-enamelled surface parts. During the manufacture of the housing a layer of carbon or graphite placed on the part of the surfaces coated with aluminium nitride protects same against oxidation reactions during the enamelling and welding operations. In this way a stability of the material also at temperatures up to over 1100° C. can be achieved.

According to an alternative embodiment, the non-enamelled part of the surface of the pressure housing may be provided with a layer of gold. Gold has the advantage of a very high heat conductivity as well as indifference to oxidation processes, which is why in this case a carbon or graphite layer during the welding and enamelling processes can be dispensed with and the gold plating can be provided directly on the blank steel. The chemo-selective gold plating replaces here the previously used silver plating. As a result of the gold plating the operating surfaces become more chemically resistant. Notwithstanding the comparatively high price of gold, in this way corrosion of the surfaces of the non-enamelled part of the pressure housing can be avoided in a relatively economical manner, seeing that the gold plating need only be applied in a thickness in the $\mu$m-range.

The invention will be explained in greater detail with reference to the attached drawings which illustrate a non-limitative exemplified embodiment of the present invention. In the drawings:

BRIEF DESCRIPTION OF DRAWINGS

FIG. 2a shows a housing for the apparatus according to the invention for the production of synthesis gas;

FIG. 2b shows the housing of FIG. 2a in a top view;

FIG. 2c shows a diagrammatic view of a process implementation according to the invention.

FIGS. 1a and 1b illustrate a micro-hollow fiber suitable for the implementation of the process according to the invention, which as a whole is indicated by the reference numeral 1. The micro-hollow fiber 1 is semi-permeable or parasemi-permeable and carries on its surfaces the two electrodes separate from one another, in this case the anode 2 on the outside and the cathode 3 on the inside. Which of the two electrodes is used as cathode or anode depends on the conducting of the material flows. The electrodes may on their outside surfaces each be coated with a catalyst which may, for example, be in the form of a spun fleece.

FIG. 1c illustrates diagrammatically the arrangement of the micro-hollow fibers 1 in a frame 4, in which the micro-hollow fiber ends are firmly bound in, e.g. by casting. So as not to impair the clarity of the illustration, in this Figure only four micro-hollow fibers are shown enlarged and arranged at a greater distance from one another. In practice the individual micro-hollow fibers are packed closely together and are stacked over the entire height of the frame perpendicular to the plane of the Figure. The frame 4 is preferably rectangular or square, wherein the micro-hollow fibers 1 are arranged parallel to one another. Several frames can be stacked on top of one another and/or in each instance four frames can be arranged in the form of a circle offset by 90° relative to one another.

Figure 1C:
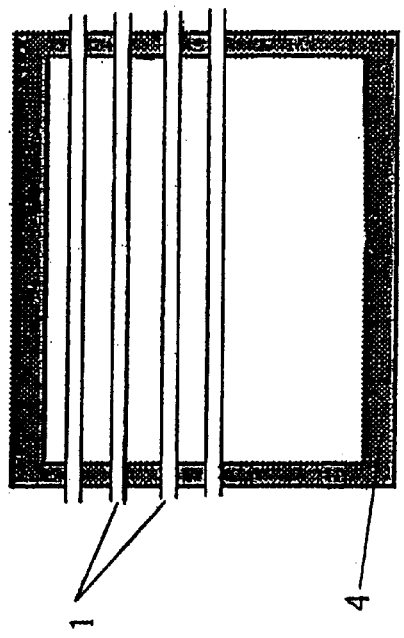
FIG. 1c shows a diagrammatic view of a hollow fiber stack.
Figure 1B:
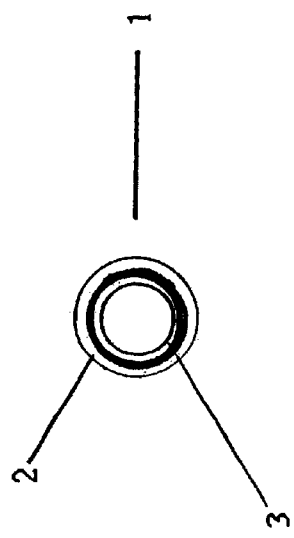
FIG. 1b is a cross-section through the micro-hollow fiber of FIG. 1.
Figure 1A:
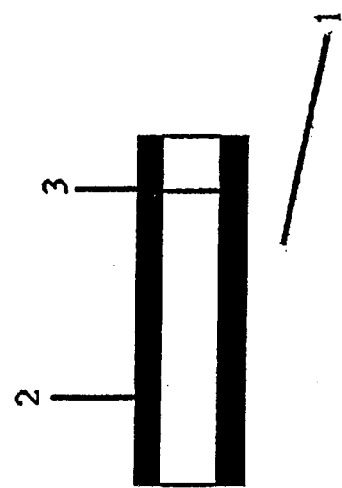
FIG. 1a shows a longitudinal section through a micro-hollow fiber for use in the process according to the invention.

The frames 4 are accommodated in a housing 5, illustrated in the FIGS. 2a and 2b, which can withstand the pressures that occur during the synthesis gas production and any subsequent reactions. In such a housing 5 several function modules may be accommodated, which are used, for example, for the synthesis gas production, the gas separation as well as the heat exchange between several material flows. The material flows shown in these figures are indicated only by way of example. In practice the conducting of the material flows depends on the type and arrangement of the individual function modules in the housing 5.

An example of the conducting of the material flows is shown in FIG. 2c. The reference index a indicates the function module for the synthesis gas production, which is illustrated diagrammatically by a micro-hollow fiber in cross-section. Carbon dioxide and water or water vapour are preferably fed in axially to the plane of the micro-hollow fiber stack, react on the electrodes, wherein the resultant oxygen again flows out perpendicularly from the hollow fibers, whereas the synthesis gas, essentially $H_2$ and $CO_2$, possibly containing some $CO_x$, flows out of the ends of the hollow fibers. This conduction of the material flows is particularly advantageous seeing that the synthesis gas production takes place under pressure, for which the micro-hollow fibers are unsuitable because of their small diameter. Preferably, another micro-hollow fiber stack b of non-permeable material is provided as heat exchanger element, in which case, as shown in the FIG., the synthesis gas and the formed oxygen are fed separately from one another into one end of different micro-hollow fibers, which are constructed as a gas separating membrane. The $H_2O$ and $CO_2$ used for the synthesis gas production are supplied perpendicularly to this stack before being passed over the micro-hollow fibers of stack a. The module or stack c serves to separate the hydrogen from the synthesis gas. To this end the synthesis gas is again preferably fed perpendicular to the plane of the stack over the semi-permeable micro-hollow fibers, wherein the hydrogen diffuses through the hollow fiber walls and can be led out of the ends of the micro-hollow fibers, whereas the $CO_2$ is led out perpendicular to the plane of the stack.

Optionally, inside the same pressure housing 5 a section may be provided for the subsequent synthesis of methyl alcohol as well as a micro-hollow fiber stack or module for the already described gas reforming process. It is possible to use the heat released during the synthesis of the methyl alcohol for the air-conditioning of the vehicle when the apparatus according to the invention is used in a motor vehicle. The methyl alcohol can furthermore be stored in a tank.

The material flow conduction indicated in the foregoing has been given only by way of example. Naturally, depending on the requirements, also different material flow conductions are possible. Because of the smallness of the overall arrangement, which is made possible by the use of micro-hollow fibers for the various process steps, the pressure housing with the individual function modules can be accommodated in or on a motor vehicle so as to make available the fuel required for an electric motor vehicle drive by means of a fuel cell.

For the Purposes of this Specification:

$$1 bar = 1 \times 10^5 Pa$$

What is claimed

1. Process for producing synthesis gas by electrolysis comprising exchanging heat between reactants and reaction products of at least one reaction carried out by micro-hollow fibers having non-activated surfaces as heat exchangers and the electrolysis is carried out by textile micro-hollow fibers as solid electrolytes having inside and outside surfaces carrying anodes and cathodes respectively.

2. Process according to claim 1, characterized in that the textile micro-hollow fibers are made from an oxide of a Group IVB metal which is stabilized with a rare earth metal.

3. Process according to claim 2, characterized in that the textile micro-hollow fibers are made from yttrium-stabilized zirconium oxide.

4. Process according to claim 1, characterized In that the micro-hollow fibers have an outside diameter of approximately 1 µm to 10 mm, especially from approximately 50 µm to 280 µm.

5. Process according to claim 1, characterized in that carbon dioxide and water or water vapour are each fed into one end of the hollow fiber lumen and are subjected to a high-temperature electrolysis, wherein the oxygen passing out through the wall of the hollow fibers as a permeate is drawn off separately from the synthesis gas in the form of a mixture of carbon monoxide and hydrogen flowing out of the second end of the hollow fiber lumen.

6. Process according to claim 5, characterized in that the formed oxygen, on leaving the lumen of the hollow fiber electrolyte, is separated from the carbon monoxide by passing it through a gas separating membrane.

7. Process according to claim 6, characterized in that the gas separating membrane is made as a micro-hollow fiber membrane.

8. Process according to claim 6, characterized in that the formed hydrogen is fed to a fuel cell as fuel.

9. Process according to claim 8, characterized in that at least one reaction product of the fuel cell reaction is fed back into synthesis gas reaction.

10. Process according to claim 1, characterized in that carbon monoxide is separated and synthesized with hydrogen or a hydrogen-supplier into a hydrocarbon-containing compound.

11. Process according to claim 10, characterized in that the hydrogen required for synthesis of methyl alcohol is obtained from salt solutions of elements of the eighth sub-group wherein as catalysts metal hydrides are use and required reaction energy is obtained by means of an electrolyser.

12. Process according to claim 11, wherein eighth sub-group includes palladium, rhodium, ruthenium, or platinum.

13. Process according to claim 11, wherein said metal hydrides include at least one of magnesium hydride, iron titanium hydride, or metal carbide.

14. Process according to claim 10, wherein said hydrocarbon-containing compound is methyl alcohol.

15. Process according to claim 1, characterized in that carbon dioxide required for synthesis gas reaction is obtained from reactions of carbon-containing compounds with water or water vapour, from gases that contain carbon dioxide or from solid storage media.

16. Process according to claim 15, wherein said solid storage media includes barium carbonate.

17. Apparatus for producing synthesis gas by electrolysis, comprising a multitude of stacked textile micro-hollow fibers as solid electrolytes, the inside and outside surfaces of which carry anodes and cathodes, respectively, wherein the ends of the micro-hollow fibers are bound into a frame, and a pressure housing accommodating said stack, said pressure housing is made from a ferromagnetic material and having a partly enameled surface.

18. Apparatus according to claim 17, characterized in that the micro-hollow fibers inside the stack are arranged parallel to one another and the frame has a rectangular or square shape.

19. Apparatus according to claim 17, characterized in that the micro-hollow fibers are made from an oxide of a Group IVB metal which is stabilized with a rare earth metal.

20. Apparatus according to claim 19, characterized in that the textile micro-hollow fibers are made from yttrium-stabilized zirconium oxide.

21. Apparatus according to claim 17, characterized in that it comprises at least one further stack of textile micro-hollow fibers which act as a gas separating membrane for reaction products of the synthesis gas production.

22. Apparatus according to claim 21 characterized in that the individual stacks form an angle of approx. 90° relative to one another.

23. Apparatus according to claim 17, characterized in that the micro-hollow fibers have an outside diameter of about 50 $\mu$m to 280 $\mu$m.

24. Apparatus according to claim 17, characterized in that the micro-hallow fibers have an out side diameter of about 50 $\mu$m to 280 $\mu$m.

25. Apparatus according to claim 17, characterized in the non-enameled part of the surface of the pressure housing is provided with a coating of aluminum nitride, 26. Apparatus according to claim 17, characterized in that the non-enamelled part of the surface of the pressure housing is provide with a layer of gold.

* * * * *